US012241280B2

(12) United States Patent
Lehner, Jr. et al.

(10) Patent No.: US 12,241,280 B2
(45) Date of Patent: Mar. 4, 2025

(54) EXIT DEVICE ASSEMBLY WITH INTEGRATED ACCESS CONTROL

(71) Applicant: Schlage Lock Company LLC, Carmel, IN (US)

(72) Inventors: Jack R. Lehner, Jr., Indianapolis, IN (US); Daniel Cannon, Indianapolis, IN (US); David V. Toloday, Martinsville, IN (US); John D. Stalter, Indianapolis, IN (US); Jason Fodstad, Zionsville, IN (US); Terry Small, Indianapolis, IN (US)

(73) Assignee: Schlage Lock Company LLC, Carmel, IN (US)

(*) Notice: Subject to any disclaimer, the term of this patent is extended or adjusted under 35 U.S.C. 154(b) by 153 days.

(21) Appl. No.: 17/104,284

(22) Filed: Nov. 25, 2020

(65) Prior Publication Data

US 2021/0156170 A1 May 27, 2021

Related U.S. Application Data

(60) Provisional application No. 62/939,722, filed on Nov. 25, 2019.

(51) Int. Cl.

| | |
|---|---|
| ***E05B 47/00*** | (2006.01) |
| ***E05B 1/00*** | (2006.01) |
| ***E05B 65/10*** | (2006.01) |

(52) U.S. Cl.

CPC ........ *E05B 47/0001* (2013.01); *E05B 1/0015* (2013.01); *E05B 65/1053* (2013.01);

(Continued)

(58) Field of Classification Search

CPC ............. E05B 65/1046; E05B 65/1053; E05B 65/108; E05B 65/1093; E05B 2047/0073;

(Continued)

(56) References Cited

U.S. PATENT DOCUMENTS 4,573,333 A * 3/1986 Choi .................. E05B 47/0002 292/201

4,875,722 A * 10/1989 Miller ................ E05B 65/1073 292/201

(Continued)

FOREIGN PATENT DOCUMENTS

FR 2818303 A1 * 6/2002 ......... E05B 65/1046

*Primary Examiner* — Christine M Mills
*Assistant Examiner* — Peter H Watson
(74) *Attorney, Agent, or Firm* — Taft Stettinius & Hollister LLP

(57) ABSTRACT

An exemplary exit device system includes a pushbar assembly and a control system. The pushbar assembly includes a latch having an extended position and a retracted position, a blocking member having a blocking position in which the blocking member retains the latch in the extended position and an unblocking position in which the blocking member permits the latch to move to the retracted position, a pushbar operable to move the blocking member between the blocking position and the unblocking position, and an electronic driver operable to move the blocking member between the blocking position and the unblocking position. The control system is configured to operate the electronic driver to electrically move the blocking member between the blocking position and the unblocking position based upon information received from a credential reader.

20 Claims, 5 Drawing Sheets

(52) U.S. Cl.
CPC ................. *E05B 2047/0073* (2013.01); *E05B 2047/0094* (2013.01)

(58) Field of Classification Search
CPC ..... E05B 2047/0094; E05B 2047/0095; E05B 47/0001; E05B 47/0607; E05B 47/0012; E05B 47/0611
USPC ................................................ 292/92, 93, 94
See application file for complete search history.

(56) References Cited

U.S. PATENT DOCUMENTS

| | | | | |
|---|---|---|---|---|
| 4,961,330 | A | 10/1990 | Evans | |
| 5,340,171 | A * | 8/1994 | Slaybuagh | E05B 47/023 292/201 |
| 5,823,582 | A * | 10/1998 | Frolov | G07C 9/00674 292/251.5 |
| 5,987,945 | A | 11/1999 | Ruano Aramburu | |
| 5,988,708 | A | 11/1999 | Frolov et al. | |
| 6,048,000 | A * | 4/2000 | Geringer | E05B 47/0607 70/92 |
| 7,484,777 | B2 * | 2/2009 | Condo | E05B 65/1053 70/92 |
| 7,536,885 | B1 * | 5/2009 | Ross | E05B 65/1073 70/92 |
| 7,918,117 | B2 | 4/2011 | Frolov et al. | |
| 8,590,948 | B2 * | 11/2013 | Shen | E05B 47/0673 70/279.1 |
| 8,851,530 | B2 * | 10/2014 | Geringer | E05B 47/0012 292/201 |
| 8,978,305 | B2 * | 3/2015 | Morstatt | E05B 65/1093 292/201 |
| 9,273,495 | B2 * | 3/2016 | Tien | E05B 65/10 |
| 9,995,060 | B2 | 6/2018 | Miller et al. | |
| 10,060,158 | B2 | 8/2018 | Frolov et al. | |
| 2005/0121918 | A1 * | 6/2005 | Smock | E05B 17/0029 292/109 |
| 2006/0010942 | A1 * | 1/2006 | Toloday | E05B 63/0065 70/210 |
| 2006/0192393 | A1 * | 8/2006 | Johansson | E05B 65/10 292/93 |
| 2007/0246946 | A1 * | 10/2007 | Arlinghaus | E05B 15/102 292/93 |
| 2007/0246947 | A1 * | 10/2007 | Banks | E05B 57/00 292/93 |
| 2011/0047874 | A1 * | 3/2011 | Lowder | E05B 65/1053 49/31 |
| 2014/0020295 | A1 | 1/2014 | Bonahoom et al. | |
| 2015/0322696 | A1 | 11/2015 | Dudley | |
| 2017/0186256 | A1 * | 6/2017 | Dumas | H04B 17/27 |
| 2017/0352216 | A1 | 12/2017 | Donovan | |
| 2018/0245375 | A1 * | 8/2018 | Arlinghaus | E05B 81/77 |
| 2018/0283050 | A1 | 10/2018 | Miller et al. | |
| 2019/0066413 | A1 | 2/2019 | McLeod et al. | |
| 2019/0323261 | A1 * | 10/2019 | McGrath | G07C 9/00571 |

* cited by examiner

EXIT DEVICE ASSEMBLY WITH INTEGRATED ACCESS CONTROL

CROSS-REFERENCE TO RELATED APPLICATIONS

The present application claims the benefit of U.S. Provisional Patent Application No. 62/939,722 filed Nov. 25, 2019, the contents of which are incorporated by reference in their entirety.

TECHNICAL FIELD

The present disclosure generally relates to exit devices, and more particularly but not exclusively relates to exit device assemblies with integrated access control.

BACKGROUND

Gaining access into a building with an electronic credential can be accomplished by various methods, including electric strikes, electric latch retraction, electrically-actuated trim, and magnetic locking mechanisms. However, these products typically require installation of multiple pieces of equipment beyond the access control device itself, such as connection to one or more of a power supply, an access control system, a frame-mounted credential reader, and/or electric hinges. This equipment and the installation thereof can be expensive and time-consuming, and in certain cases may be infeasible. For example, older facilities may not necessarily have power lines readily available at the closure to which an access control device is to be installed, which may preclude the use of line-powered access control devices. For these reasons among others, there remains a need for further improvements in this technological field.

SUMMARY

An exemplary exit device system includes a pushbar assembly and a control system. The pushbar assembly includes a latch having an extended position and a retracted position; a blocking member having a blocking position in which the blocking member retains the latch in the extended position and an unblocking position in which the blocking member permits the latch to move to the retracted position; a pushbar operable to move the blocking member between the blocking position and the unblocking position; and an electronic driver operable to move the blocking member between the blocking position and the unblocking position. The control system is configured to operate the electronic driver to electrically move the blocking member between the blocking position and the unblocking position based upon information received from a credential reader. Further embodiments, forms, features, and aspects of the present application shall become apparent from the description and figures provided herewith.

DETAILED DESCRIPTION OF ILLUSTRATIVE EMBODIMENTS

Figure 1:
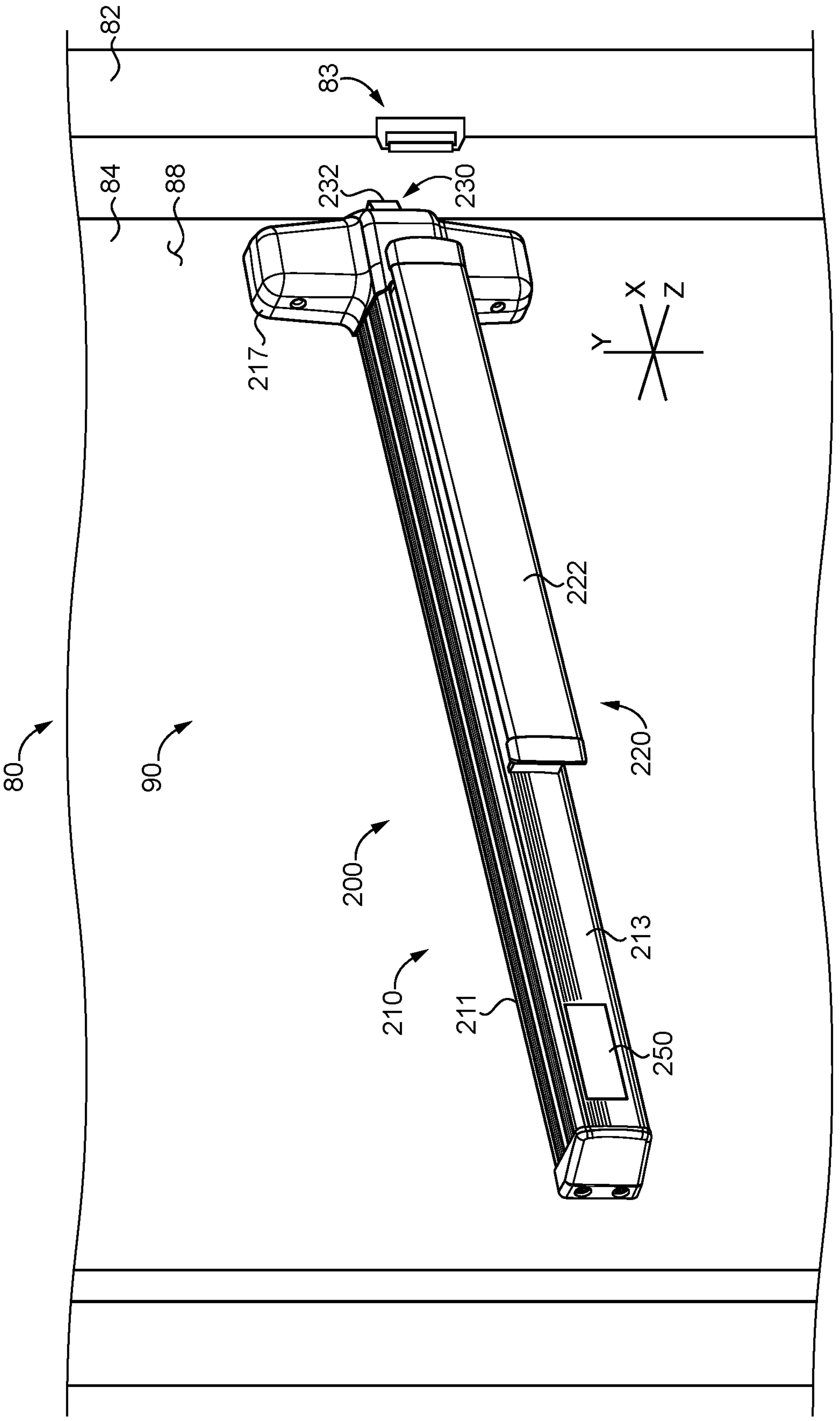
FIG. 1 is a perspective view of an exit device assembly according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 2:
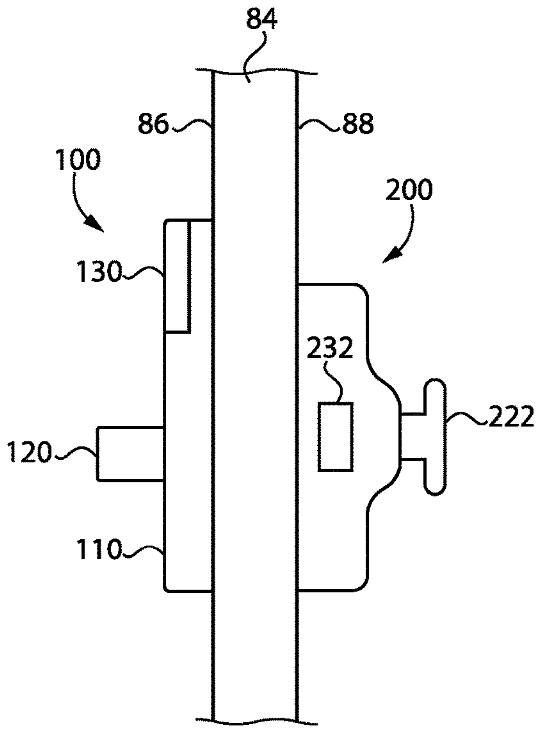
FIG. 2 is a schematic representation of the exit device assembly illustrated in FIG. 1.

With reference to FIGS. 1 and 2, illustrated therein is a closure assembly 80 including a door frame 82, a door 84 pivotably mounted to the door frame 82, and an exit device system 90 according to certain embodiments. The exit device system 90 generally includes a trim assembly 100 mounted to a first side 86 of the door 84, and a pushbar assembly 200 mounted to an opposite second side 88 of the door 84. The first side 86 of the door 84 may also be referred to herein as the non-egress side 86, and the second side 88 of the door 84 may also be referred to herein as the egress side 88.

The trim assembly 100 generally includes an escutcheon 110, a handle 120 mounted to the escutcheon 110, and a credential reader 130 mounted to the escutcheon 110. In the illustrated form, the credential reader 130 is mounted to the escutcheon 110. It is also contemplated that the credential reader 130 may be a standalone reader that may, for example, be mounted to the wall adjacent the door 84. In certain forms, the trim assembly 100 is provided as dummy trim assembly, in which the handle 120 is not operably coupled with the pushbar assembly 200. For example, the trim assembly 100 may be provided as a fixed trim assembly in which the handle 120 is non-rotatably secured to the escutcheon 110. The credential reader 130 may, for example, be provided as a card reader, a keypad or code entry device, a biometric credential reader, or another form of credential reader. The credential reader 130 is operable to receive a credential (e.g., an electronic token, a code, or a biometric credential) from a user positioned on the non-egress side 86 of the door 84. As described herein, if the credential is valid, the user will be permitted to open the door 84.

Figure 3:
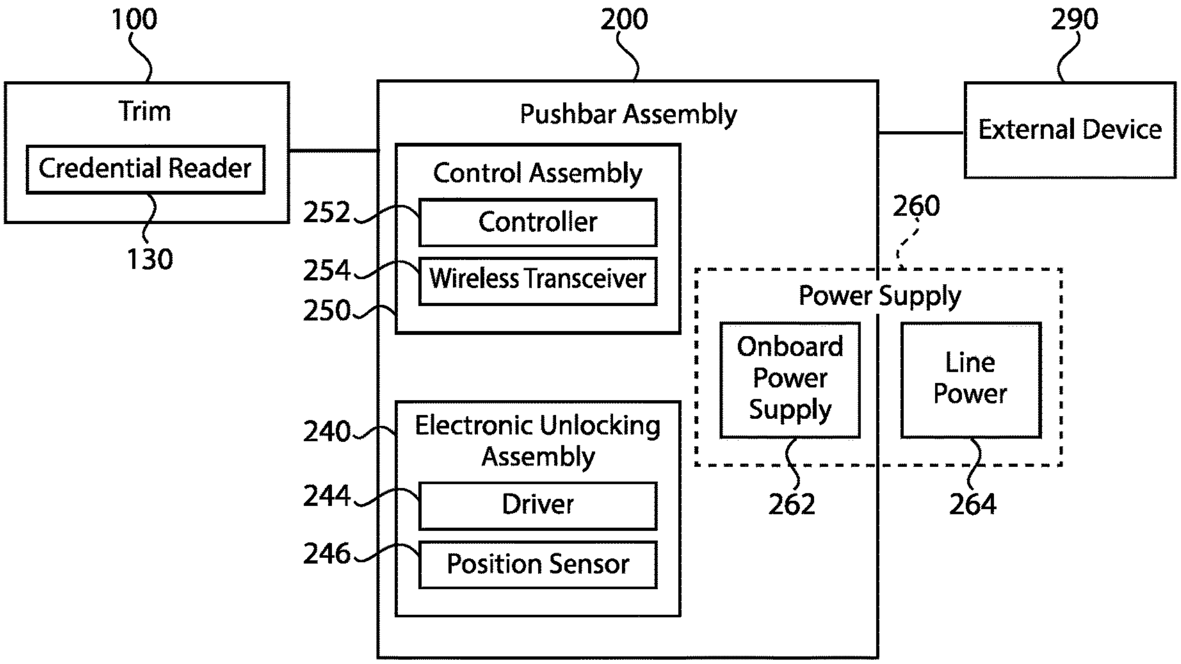
FIG. 3 is a schematic block diagram of a system according to certain embodiments.

With additional reference to FIG. 3, the pushbar assembly 200 generally includes a mounting assembly 210, a drive assembly 220 movably mounted to the mounting assembly 210, and a latchbolt mechanism 230 operably coupled with the drive assembly 220 such that the drive assembly 220 is operable to transition the latchbolt mechanism 230 between a secured state and an unsecured state. The pushbar assembly 200 further includes an electronic unlocking assembly 240 operable to selectively transition the latchbolt mechanism 230 to the unsecured state, and a control assembly 250 in communication with the unlocking assembly 240 and the credential reader 130. The electronic components of the pushbar assembly 200, including the electronic unlocking assembly 240 and the control assembly 250, are connected with a power supply 260 such that the electronic components are operable to draw power from the power supply 260.

The mounting assembly 210 is configured for mounting to the door 84, and generally includes an elongated channel member 211 defining a channel, a cover plate 213 covering a distal end portion of the channel, and a header case 217 positioned at a proximal end of the channel member 211. In certain forms, the cover plate 213 may include a window through which the control assembly 250 is operable to wirelessly communicate with an external device.

Figure 4:
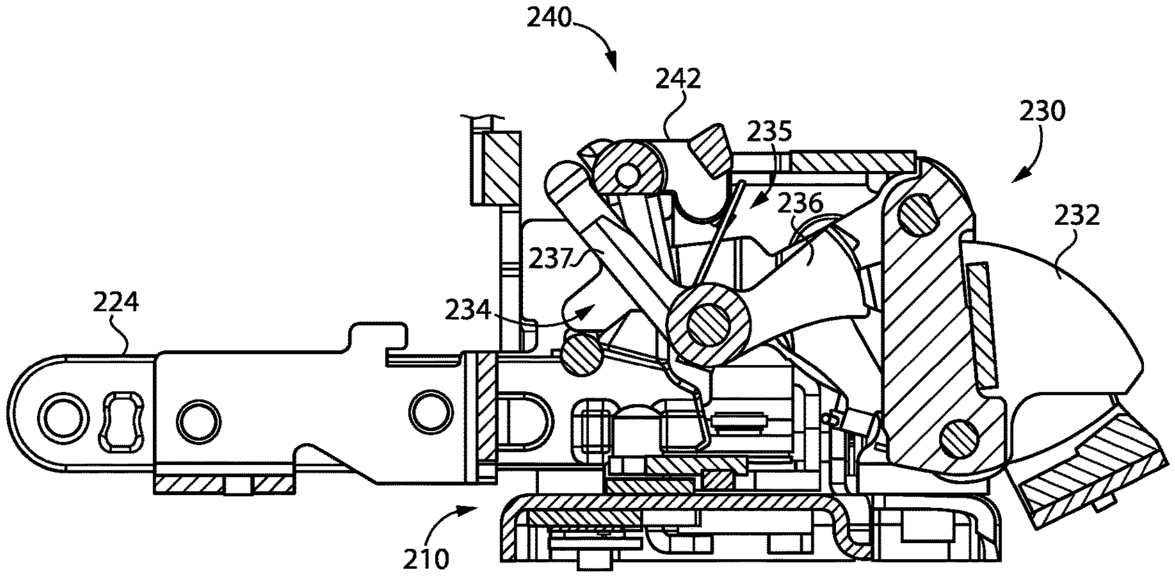
FIG. 4 is a cutaway view of a latchbolt mechanism along with an electronic unlocking assembly in a locking state.
Figure 5:
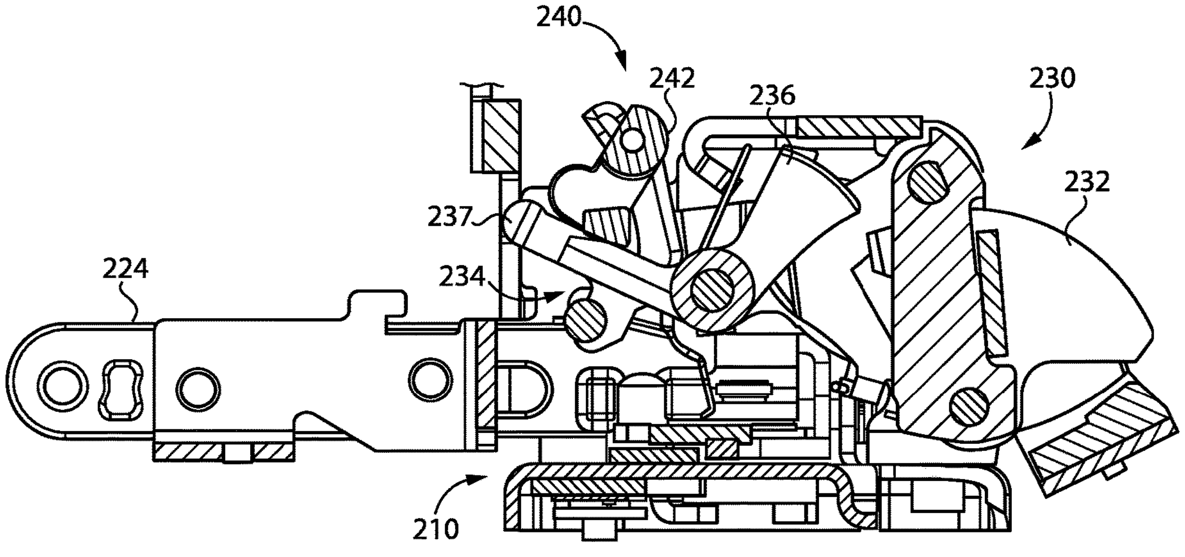
FIG. 5 is a cutaway view of the latchbolt mechanism along with the electronic unlocking assembly in an unlocking state.

With additional reference to FIGS. 4 and 5, the drive assembly 220 is movably mounted to the mounting assembly 210, and generally includes a pushbar 222 mounted for movement between a projected position and a depressed position, and a control link 224 operably connected with the pushbar 222 such that the control link 224 moves between a deactuated position and an actuated position as the pushbar 222 moves between the projected position and the depressed position. The control link 224 may, for example, be engaged with pushbar 222 via one or more bell cranks that translate the transverse movement of the pushbar 222 to longitudinal movement of the control link 224. The drive assembly 220 is biased toward a deactuated state, in which the pushbar 222 is in its projected position and the control link 224 is in its deactuated position. As the pushbar 222 is driven to its depressed position, for example by a user exerting a force on the pushbar 222, the drive assembly 220 transitions to an actuated state, in which the control link 224 is in its actuated position. As described herein, the latchbolt mechanism 230 is configured to move between the secured state and the unsecured state in response to movement of the drive assembly 220 between its actuated and deactuated states.

The latchbolt mechanism 230 generally includes a latchbolt 232 mounted for movement between an extended position and a retracted position, and a blocking member 234 operable to selectively retain the latchbolt 232 in its extended position. The blocking member 234 has a blocking position and an unblocking position, and may be biased toward the blocking position, for example by a biasing member 235 engaged between the mounting assembly 210 and the blocking member 234. While the illustrated biasing member 235 is provided in the form of a torsion spring, it is also contemplated that other biasing members may be utilized, such as compression springs, extension springs, leaf springs, elastic members, and/or magnets. The illustrated blocking member 234 is pivotably mounted to the mounting assembly 210, and includes a first arm 236 operable to engage the rear side of the latchbolt 232 and a second arm 237 operable to be engaged by the electronic unlocking assembly 240. As described herein, the blocking member 234 is operable to be moved between its blocking position and its unblocking position both manually by operation of the drive assembly 220 and electronically by operation of the electronic unlocking assembly 240. In the illustrated form, the blocking member 234 is mounted for pivotal movement between its blocking and unblocking positions. In other embodiments, the blocking member 234 may be mounted for another type of movement between its blocking and unblocking positions, such as linear movement.

When the door 84 is in its closed position and the latchbolt 232 is extended, the latchbolt 232 engages a strike 83 mounted to the door frame 82. When the door 84 is urged toward its open position, the strike 83 urges the latchbolt 232 toward its retracted position. When the blocking member 234 is in its blocking position, however, this inward movement of the latchbolt 232 is prevented, for example by engagement of the arm 236 with the rear side of the latchbolt 232. As such, the latchbolt mechanism 230 is in its secured state, and the pushbar assembly 200 retains the door 84 in the closed position. When the blocking member 234 is in its unblocking position, inward movement of the latchbolt 232 is permitted. As such, the latchbolt mechanism 230 is in its unsecured state, and the door 84 is capable of being moved toward an open position.

Figure 6:
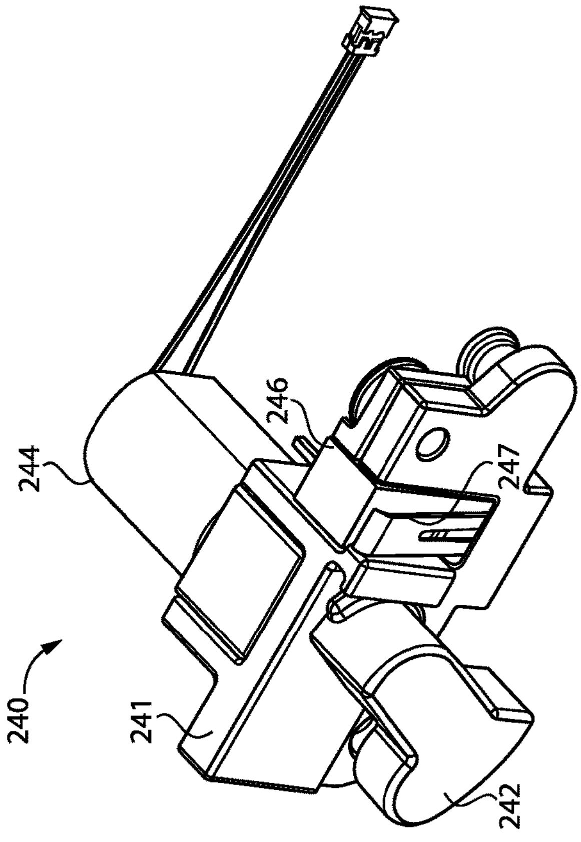
FIG. 6 is a perspective illustration of an electronic unlocking assembly according to certain embodiments.

With additional reference to FIG. 6, the electronic unlocking assembly 240 generally includes a housing 241, a cam 242 movably mounted to the housing 241, and a driver 244 mounted to the housing 241 and operable to drive the cam 242 between a locking position and an unlocking position. The unlocking assembly 240 may further include a position sensor 246 associated with the cam 242 such that the position sensor 246 is capable of detecting the position of the cam 242. The driver 244 and the sensor 246 are in communication with the control assembly 250 such that the control assembly 250 is operable to control operation of the driver 244 and receive information from the sensor 246.

While other forms are contemplated, in the illustrated form, the cam 242 is pivotably mounted to the housing 241, and the driver 244 is provided as a rotary motor operable to rotate the cam 242 between its locking and unlocking positions. It is also contemplated that the driver 244 may take another form, such as that of a solenoid or a linear actuator. For example, in embodiments in which the cam 242 is slidably mounted to the housing 241, the driver 244 may be configured to slide the cam 242 between its locking and unlocking positions.

In the illustrated embodiment, the sensor 246 is provided in the form of a snap action mechanical switch that is actuated and deactuated as the cam 242 moves between its locking and unlocking positions. The sensor 246 includes an armature 247 that is depressed by the cam 242 when the cam 242 is in its locking position, and which is projected when the cam 242 is in its locking position. Depression and projection of the armature 247 actuates and deactuates the sensor 246 such that the locking/unlocking position of the cam 242 can be determined based upon the actuated/deactuated state of the sensor 246. It is also contemplated that the position sensor 246 may be provided in another form, such as a magnetic sensor or an optical sensor. For example, the cam 242 may include a magnet, and the sensor 246 may be provided in the form of a Hall effect sensor or a reed switch.

The control assembly 250 is in communication with the credential reader 130 and the electronic unlocking assembly 240, and generally includes a controller 252 operable to control the driver 244 and to receive information from the sensor 246. The control assembly 250 may further include a wireless transceiver 254 to facilitate communication with an external device 290, such as a mobile device or a gateway. The wireless transceiver 254 may, for example, include a Bluetooth transceiver and/or a Wi-Fi transceiver. Additionally or alternatively, the control assembly 250 may be in communication with the external device 290 via a wired connection. It is also contemplated that the exit device system 90 may be provided in a standalone configuration that is not necessarily in communication with an external device 290.

The power supply 260 is connected with the control assembly 250, and is operable to provide electrical power to the control assembly 250 such that the control assembly 250 is capable of powering the driver 244. In certain embodiments, the power supply 260 may be an onboard power supply 262, such as one or more batteries and/or one or more supercapacitors. Additionally or alternatively, the power supply 260 may be provided as line power 264. In certain forms, the power supply 260 may further be connected to the credential reader 130 such that the credential reader 130 is operable to draw power from the power supply 260. In other embodiments, the trim assembly 100 may include its own onboard power supply and/or connection to line power 264.

As noted above, the blocking member 234 is operably connected with the drive assembly 220 such that the drive assembly 220 is operable to move the blocking member 234 between its blocking and unblocking positions. More particularly, the blocking member 234 is operably connected with the pushbar 222 via the control link 224 such that depression of the pushbar 222 causes the control link 224 to move the blocking member 234 from its blocking position to its unblocking position, thereby transitioning the latchbolt mechanism 230 to its unsecured state. When the pushbar 222 is released, the biasing member 235 returns the blocking member 234 to its blocking position, thereby returning the latchbolt mechanism 230 to its secured state. Thus, manual actuation of the drive assembly 220 is operable to cause the blocking member 234 to move from the blocking position to the unblocking position.

The blocking member 234 is also capable of being moved from its blocking position to its unblocking position by operation of the electronic unlocking assembly 240 such that the latchbolt mechanism 230 is capable of being electronically transitioned between the secured state and the unsecured state. As noted above, the cam 242 has a blocking position (FIG. 4) and an unblocking position (FIG. 5), and is capable of being driven between its locking and unlocking positions by operation of the driver 244. The cam 242 is aligned with the second arm 237 of the blocking member 234 such that movement of the cam 242 from the locking position to the unlocking position pivots the blocking member 234 from its blocking position (FIG. 4) to its unblocking position (FIG. 5). Thus, by controlling operation of the driver 244, the control assembly 250 is operable to electronically control the secured/unsecured state of the latchbolt mechanism 230. The control assembly 250 is also operable to detect whether the latchbolt mechanism 230 has been electronically driven to the unsecured state by operation of the position sensor 246, and may therefore determine an electrically-unlocked state of the latchbolt mechanism 230 based upon the information received from the sensor 246.

In the illustrated form, the drive assembly 220 and the electronic unlocking assembly 240 are independently operable to move the blocking member 234 between its blocking and unblocking positions. In other forms, the electronic unlocking assembly 240 may be operably connected with the drive assembly 220 such that actuation of the electronic unlocking assembly 240 causes a corresponding actuation of the drive assembly 220. For example, the driver 244 may be operably connected with the pushbar 222 and/or the control link 224 such that the driver 244 is capable of actuating the drive assembly 220 to move the blocking member 234 to its unblocking position. While such an arrangement will typically require more power than the illustrated configuration, the additional power requirements may be of lesser concern in certain embodiments, such as those in which the exit device system 90 is connected to line power 264.

Figure 7:
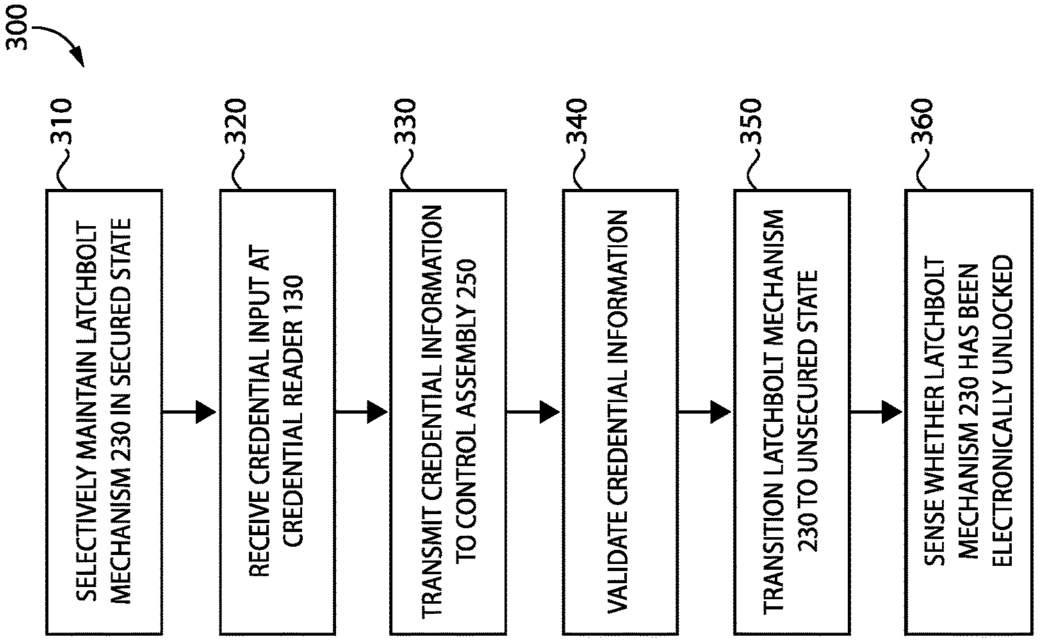
FIG. 7 is a schematic flow diagram of a method according to certain embodiments.

With additional reference to FIG. 7, an exemplary process 300 that may be performed using the exit device system 90 is illustrated. Operations illustrated for the processes in the present application are understood to be examples only, and operations may be combined or divided, and added or removed, as well as re-ordered in whole or in part, unless explicitly stated to the contrary. Unless specified to the contrary, it is contemplated that certain operations or steps performed in the process 300 may be performed wholly by a credential, the credential reader 130, the electronic unlocking assembly 240, the control assembly 250, and/or the external device 290, or that the operations or steps may be distributed among one or more of the elements and/or additional devices or systems that are not specifically illustrated in FIGS. 1-6. Further, while the blocks of the process 300 are illustrated in a relatively serial fashion, it is contemplated that two or more of the blocks may be performed concurrently. It should also be appreciated that while the process 300 is described with specific reference to the exit device system 90 illustrated in FIGS. 1-6, it is also contemplated that the process 300 may be performed using exit device systems having additional and/or alternative features.

The process 300 may begin with block 310, which generally involves selectively retaining the latchbolt mechanism 230 in the secured state. Block 310 may, for example, involve selectively retaining the blocking member 234 in its blocking position, such as by operation of the biasing member 235. With the door 84 in the closed position, this selective retention of the secured state of the latchbolt mechanism 230 prevents opening of the door 84 from the non-egress side 86. As noted above, however, the drive assembly 220 remains capable of transitioning the latchbolt mechanism 230 to the unsecured state to permit opening of the door 84 from the egress side 88. The process 300 further includes selectively transitioning the latchbolt mechanism 230 to the unsecured state to selectively permit opening of the door 84 from the non-egress side 86, for example by performing blocks 320-350.

The process 300 generally includes block 320, which involves receiving a credential input at the credential reader 130. For example, in embodiments in which the credential reader 130 comprises a card reader, block 320 may involve receiving an electronic token from a physical credential. In embodiments in which the credential reader 130 comprises a keypad or code entry device, block 320 may involve receiving input of a personal identification number (PIN), a password, or another form of code. In embodiments in which the credential reader 130 comprises a biometric credential reader, block 320 may involve reading a biometric credential, such as via a fingerprint scan, an iris scan, and/or a retina scan. In other embodiments, block 320 may involve receiving credential information of another type.

In response to receiving the credential input in block 320, the process 300 may continue to block 330, in which the credential reader 130 may transmit to the control assembly 250 credential information related to the received credential. In certain embodiments, a portion of the control assembly 250 may be included in the credential reader 130 such that the credential reader 130 transmits the credential information to that portion of the control assembly 250. In certain embodiments, the credential reader 130 may transmit the credential information to a portion of the control assembly 250 that is positioned in the pushbar assembly 200 or at the external device 290.

In response to receiving the credential information from the credential reader 130, the process 300 may continue to block 340, which generally involves validating the received credential information. For example, the control assembly 250 may validate the credential information by determining that the received credential information corresponds to an authorized credential assigned to or otherwise correlated with a user that is authorized to open the door 84 from the non-egress side 86.

In response to validating the credential information in block 340, the process 300 may continue to block 350, which generally involves electronically transitioning the latchbolt mechanism 230 to the unsecured state to permit entry from the non-egress side 86. Block 350 generally involves transmitting to an electronic unlocking assembly (e.g., as the electronic unlocking assembly 240) an unlock signal that causes the unlocking assembly to move the latchbolt mechanism 230 to its unsecured state. In the illustrated form, block 350 may involve operating the driver 244 to move the cam 242 to the unlocking position, thereby moving the blocking member 234 to the unblocking position without actuating the drive assembly 220. In other forms, block 350 may involve operating a driver to actuate the drive assembly 220, thereby moving the blocking member 234 to its unblocking state.

In certain forms, the process 300 may further involve block 360, which generally involves sensing whether the latchbolt mechanism 230 has been electronically unlocked. For example, when the cam 242 is in the blocking position, the armature 247 is projected such that the sensor 246 is deactuated. As a result, block 360 may involve determining that the latchbolt mechanism 230 has been electrically unlocked when output from the sensor 246 indicates that the sensor 246 is deactuated. Conversely, when the cam 242 is in the unblocking position, the armature 247 is depressed, and the sensor 246 is actuated. Thus, block 360 may involve determining that the latchbolt mechanism 230 has not been electrically unlocked when output from the sensor 246 indicates that the sensor 246 is actuated. Information related to the electrically-locked/electrically-unlocked state of the latchbolt mechanism 230 may, for example, be logged into an audit trail stored in memory of the control assembly 250.

In the illustrated embodiment, the trim assembly 100 is provided as a fixed trim in which the handle 120 is secured in a single rotational orientation relative to the escutcheon 110. As such, the trim assembly 100 is unable to provide a mechanical actuating force that would cause the pushbar assembly 200 to transition between the secured and unsecured states. In other embodiments, the trim assembly 100 may be provided as an active trim operable to provide such mechanical actuating forces. By way of example, the trim assembly 100 may include an electronic blocking assembly that selectively prevents rotation of the handle 120, and the handle 120 may be operably connected with the latchbolt mechanism 230 such that rotation of the handle 120 actuates the latchbolt mechanism 230. Exemplary embodiments of active trims including electronic blocking assemblies are disclosed in U.S. patent application Ser. No. 16/265,116 (filed Feb. 1, 2019), the contents of which are hereby incorporated by reference in their entirety.

Figure 8:
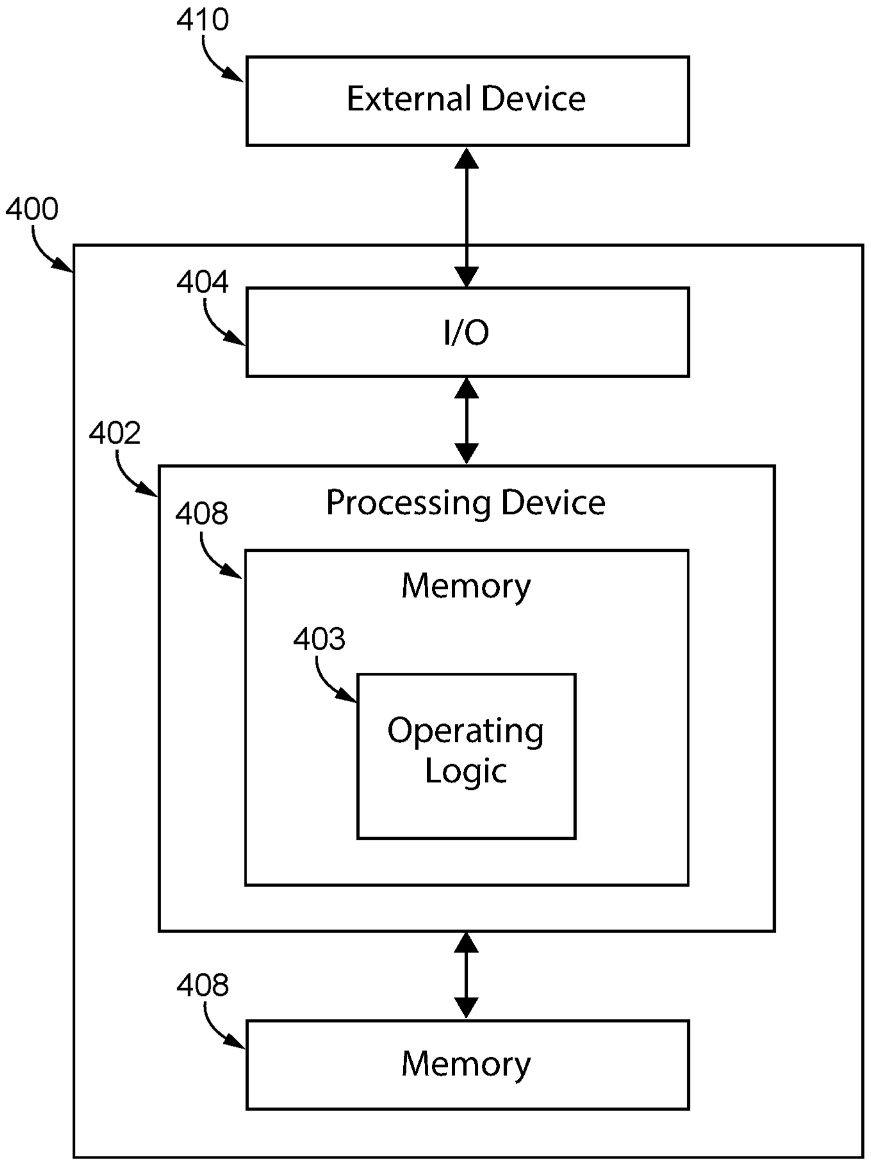
FIG. 8 is a schematic block diagram of a computing device.

Referring now to FIG. 8, a simplified block diagram of at least one embodiment of a computing device 400 is shown. The illustrative computing device 400 depicts at least one embodiment of a credential reader 130, control assembly 250, or external device 290 that may be utilized in connection with the system illustrated in FIG. 3.

Depending on the particular embodiment, the computing device 400 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 400 includes a processing device 402 that executes algorithms and/or processes data in accordance with operating logic 408, an input/output device 404 that enables communication between the computing device 400 and one or more external devices 410, and memory 406 which stores, for example, data received from the external device 410 via the input/output device 404.

The input/output device 404 allows the computing device 400 to communicate with the external device 410. For example, the input/output device 404 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 400. The input/output device 404 may include hardware, software, and/or firmware suitable for performing the techniques described herein.

The external device 410 may be any type of device that allows data to be inputted or outputted from the computing device 400. For example, in various embodiments, the external device 410 may be embodied as the credential reader 130, the control assembly 250, or the external device 290. Further, in some embodiments, the external device 410 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 410 may be integrated into the computing device 400.

The processing device 402 may be embodied as any type of processor(s) capable of performing the functions described herein. In particular, the processing device 402 may be embodied as one or more single or multi-core processors, microcontrollers, or other processor or processing/controlling circuits. For example, in some embodiments, the processing device 402 may include or be embodied as an arithmetic logic unit (ALU), central processing unit (CPU), digital signal processor (DSP), and/or another suitable processor(s). The processing device 402 may be a programmable type, a dedicated hardwired state machine, or a combination thereof. Processing devices 402 with multiple processing units may utilize distributed, pipelined, and/or parallel processing in various embodiments. Further, the processing device 402 may be dedicated to performance of just the operations described herein, or may be utilized in one or more additional applications. In the illustrative embodiment, the processing device 402 is of a programmable variety that executes algorithms and/or processes data in accordance with operating logic 408 as defined by programming instructions (such as software or firmware) stored in memory 406. Additionally or alternatively, the operating logic 408 for processing device 402 may be at least partially defined by hardwired logic or other hardware. Further, the processing device 402 may include one or more components of any type suitable to process the signals received from input/output device 404 or from other components or devices and to provide desired output signals. Such components may include digital circuitry, analog circuitry, or a combination thereof.

The memory 406 may be of one or more types of non-transitory computer-readable media, such as a solid-state memory, electromagnetic memory, optical memory, or a combination thereof. Furthermore, the memory 406 may be volatile and/or nonvolatile and, in some embodiments, some or all of the memory 406 may be of a portable variety, such as a disk, tape, memory stick, cartridge, and/or other suitable portable memory. In operation, the memory 406 may store various data and software used during operation of the computing device 400 such as operating systems, applications, programs, libraries, and drivers. It should be appreciated that the memory 406 may store data that is manipulated by the operating logic 408 of processing device 402, such as, for example, data representative of signals received from and/or sent to the input/output device 404 in addition to or in lieu of storing programming instructions defining operating logic 408. As illustrated, the memory 406 may be included with the processing device 402 and/or coupled to the processing device 402 depending on the particular embodiment. For example, in some embodiments, the processing device 402, the memory 406, and/or other components of the computing device 400 may form a portion of a system-on-a-chip (SoC) and be incorporated on a single integrated circuit chip.

In some embodiments, various components of the computing device 400 (e.g., the processing device 402 and the memory 406) may be communicatively coupled via an input/output subsystem, which may be embodied as circuitry and/or components to facilitate input/output operations with the processing device 402, the memory 406, and other components of the computing device 400. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 400 may include other or additional components, such as those commonly found in a typical computing device (e.g., various input/output devices and/or other components), in other embodiments. It should be further appreciated that one or more of the components of the computing device 400 described herein may be distributed across multiple computing devices. In other words, the techniques described herein may be employed by a computing system that includes one or more computing devices. Additionally, although only a single processing device 402, I/O device 404, and memory 406 are illustratively shown in FIG. 8, it should be appreciated that a particular computing device 400 may include multiple processing devices 402, I/O devices 404, and/or memories 406 in other embodiments. Further, in some embodiments, more than one external device 410 may be in communication with the computing device 400.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device system, comprising:

a pushbar assembly configured for installation to a first side of a door, the pushbar assembly comprising:

a housing comprising a channel member and a header case positioned at an end of the channel member;

a latch movably mounted in the header case, the latch having an extended position and a retracted position;

a blocking member movably mounted in the header case, the blocking member having a blocking position in which the blocking member retains the latch in the extended position by blocking movement of the latch to the retracted position, and an unblocking position in which the blocking member permits the latch to move to the retracted position;

a pushbar operable to move the blocking member between the blocking position and the unblocking position; and an electronic driver mounted in the header case and operable to convert electrical energy to mechanical energy to thereby move the blocking member between the blocking position and the unblocking position; and a control system in communication with the electronic driver, the control system configured to operate the electronic driver to electrically move the blocking member between the blocking position and the unblocking position based upon information received from a credential reader, and wherein the control system is positioned within the housing.

2. The exit device system of claim 1, further comprising a trim assembly configured for installation to a second side of the door opposite the first side, and wherein the trim assembly includes an escutcheon, a handle mounted to the escutcheon, and the credential reader.

3. The exit device system of claim 2, wherein the handle has a fixed rotational orientation relative to the escutcheon.

4. The exit device system of claim 1, wherein actuation of the electronic driver to move the blocking member between the blocking position and the unblocking position does not cause movement of the pushbar.

5. The exit device system of claim 1, wherein actuation of the electronic driver to move the blocking member between the blocking position and the unblocking position does not drive the latch to the retracted position.

6. The exit device system of claim 1, further comprising a cam operably coupled with the electronic driver such that the electronic driver is operable to move the cam between a locking position and an unlocking position; and wherein the cam is configured to move the blocking member between the blocking position and the unblocking position as the cam moves between the locking position and the unlocking position.

7. The exit device system of claim 6, further comprising a position sensor in communication with the control system, and wherein the position sensor is configured to sense at least one of the locking position or the unlocking position.

8. The exit device system of claim 1, wherein the electronic driver comprises a rotary motor operable to pivot the blocking member between the blocking position and the unblocking position.

9. The exit device system of claim 1, wherein the electronic driver comprises a rotary motor including a motor shaft rotatable about an axis transverse to a longitudinal axis of the channel member.

10. A method of operating an exit device system mounted to a door, wherein the exit device system includes a trim assembly mounted to a first side of the door and a pushbar assembly mounted to an opposite second side of the door, the method comprising:

selectively maintaining a latchbolt mechanism of the pushbar assembly in a secured state in which a blocking member retains a latchbolt in an extended position by blocking movement of the latchbolt from the extended position to a retracted position, wherein the latchbolt mechanism is operable in an unsecured state in which the blocking member permits the latchbolt to move from the extended position to the retracted position, wherein the pushbar assembly includes a pushbar operable to transition the latchbolt mechanism between the secured state and the unsecured state, and a housing comprising a channel member and a header case positioned at one end of the channel member, and wherein the latchbolt mechanism, the blocking member, and an electronic driver are mounted within the header case;

in response to presentation of a credential at a credential reader of the trim assembly, transmitting from the credential reader to a control assembly credential information related to the presented credential;

validating the credential information via the control assembly; and in response to validating the credential, transitioning the latchbolt mechanism from the secured state to the unsecured state, wherein the transitioning comprises supplying the electronic driver with electrical power to thereby move the blocking member from the blocking position to the unblocking position.

11. The method of claim 10, further comprising maintaining the pushbar in an extended position while transitioning the latchbolt mechanism from the secured state to the unsecured state.

12. The method of claim 10, further comprising securing a handle of the trim assembly in a fixed orientation such that the handle is not operable to rotate relative to the trim assembly.

13. The method of claim 10, wherein operating the electronic driver to move the blocking member from the blocking position to the unblocking position comprises operating the electronic driver to move a cam from a locking position to an unlocking position, thereby causing the cam to drive the blocking member from the blocking position to the unblocking position.

14. The method of claim 13, further comprising:

sensing a position of the cam; and determining a state of the latchbolt mechanism based upon the sensed position of the cam.

15. An exit device system, comprising:

a mounting assembly comprising a channel member extending along a longitudinal axis, and a header case positioned at one end of the channel member;

a latch mounted in the header case for movement between an extended position and a retracted position;

a pushbar movably mounted to the mounting assembly and connected with the latch such that the latch moves to the retracted position in response to movement of the pushbar into the channel member;

a blocking member mounted in the header case for movement between a blocking position and an unblocking position, wherein the blocking member in the blocking position blocks movement of the latch to the retracted position, and wherein the blocking member in the unblocking position does not block movement of the latch to the retracted position; and an electronic driver positioned in the header case and operable to convert electricity to mechanical power to thereby move the blocking member between the blocking position and the unblocking position.

16. The exit device system of claim 15, wherein the blocking member is mounted for pivotal movement between the blocking position and the unblocking position.

17. The exit device system of claim 15, wherein the electronic driver comprises a rotary motor comprising a motor shaft that extends in a direction transverse to the longitudinal axis.

18. The exit device system of claim 17, further comprising a cam coupled with the motor shaft, and wherein the cam is operable to move the blocking member between the blocking position and the unblocking position.

19. The exit device system of claim 15, further comprising a control system in communication with the electronic driver, and wherein the control system is configured to operate the electronic driver to electrically move the blocking member between the blocking position and the unblocking position based upon information received from a credential reader.

20. The exit device system of claim 19, further comprising a trim assembly including an escutcheon, a handle mounted to the escutcheon, and the credential reader.

* * * * *